Patented Oct. 4, 1932

1,880,558

UNITED STATES PATENT OFFICE

CHARLES S. WEBBER, OF SPRINGFIELD, MASSACHUSETTS, AND CYRIL J. STAUD, OF ROCHESTER, NEW YORK, ASSIGNORS TO EASTMAN KODAK COMPANY, OF ROCHESTER, NEW YORK, A CORPORATION OF NEW YORK

PROCESS FOR THE MANUFACTURE OF ETHER LACTATES OF CELLULOSE AND THE PRODUCT THEREOF

No Drawing.      Application filed December 14, 1929. Serial No. 414,213.

This invention relates to a process for the manufacture of ether esters of cellulose and particularly to the preparation of such mixed ether esters by treating cellulose ether with organic acids.

The preparation of mixed ether esters of cellulose has been disclosed by Leon Lilienfeld in his U. S. Patent 1,188,376. His mixed ether ester is obtained by the etherification of cellulose acetate or other organic ester of cellulose in such a manner that the saponification of the cellulose ester was not complete. He obtained, providing he incompletely etherified, not a pure cellulose ether, which he desired to produce, but a cellulose ether ester. Other methods have been proposed for the preparation of these compounds, including the acetylation or esterification of cellulose ethers containing free hydroxyl groups by subjecting the ether to an esterification bath, this esterification of the ether being conducted by subjecting the ether to the action of the organic acid anhydride of the particular acyl group it was desired to substitute for the hydroxyl groups in the cellulose.

It is obvious that while the first method of Lilienfeld might be used for the preparation of these ether esters of cellulose, this reaction is but a side reaction of his process and due to lack of control its use would not result in a good yield of this mixed ether ester. The disadvantages of using the second process described above rests primarily in the fact that the anhydride of the organic acid must be employed, and as the anhydride of any organic acid is expensive, these esters therefore will be considerably more expensive than the ether or the corresponding acylate of the cellulose.

An object of the present invention is to provide a process for the manufacture of ether esters of cellulose. A further object of this invention is to provide such a process in which a cellulose ether is treated or digested at a suitable temperature with an organic acid which it is desired to combine with the free hydroxyl groups on the cellulose ether. Other objects will hereinafter appear.

We have found that if cellulose ether be heated with an organic acid, some of the organic acid groups will combine with the cellulose ether to form a mixed ether ester of cellulose. This reaction is very similar to the simple esterification reaction that takes place on heating alcohol with an acid. While it may be not usual to consider the cellulose molecule as an alcohol, nevertheless we have found that the free hydroxyl groups that are attached thereto act somewhat in a similar manner to alcohol and will therefore combine with an organic acid to form an ester.

From our study of this reaction we find that all of the organic acids that will react with an alcohol to form an ester and which are solvents for cellulose ether will, when heated at a suitable temperature, attach themselves to the cellulose and form the ether ester of cellulose. It is not necessary, of course, that the organic acid be a liquid at room temperature, but it is an advantage if the organic acid is liquid at the temperature of the reaction and at that temperature also acts as a solvent for the cellulose ether. As would be expected, the acid which is a good solvent for the cellulose ether will react more rapidly to form the ester of the ether than will an acid which is a poor solvent of the ether.

The above statement may be somewhat modified in that some organic acids which are not solvents for the cellulose ether or even organic acids which are solids even at the temperature of the reaction may be employed for this esterification. In the use of such types of organic acids it is necessary that there be present in the esterifying bath a solvent which acts, as such, both for the cellulose ether and for the organic acid as well. The type of mutual or common solvent that is employed will be governed in each case by the organic acid and the type of cellulose ether that is used. We have found that 1–4 dioxan is a very useful solvent in this respect in that it will dissolve many of the organic acids which are not direct solvents for the cellulose ethers, and it likewise dissolves very readily many of the cellulose ethers. We have found, therefore, that its use results in many advantages.

In effecting this esterification it is desirable, in order to carry out the esterification in a reasonable length of time, that the esterifying bath containing the ether of cellulose and the organic acid with or without the common solvent, as the case may be, is heated to a temperature of about 100° C. We have found that conducting the treatment in a suitable container to which a vertical or reflux condenser has been affixed conserves the more volatile constituents of the bath and thereby esterifies the cellulose ether with a somewhat smaller amount of the added ingredients. It is possible, however, to carry out the esterification at a somewhat lower temperature, but it will be understood that such a lowering of the temperature will lower the rate of the reaction somewhat. On the other hand, temperatures somewhat above 100° C. may be employed with the aid of an auto-clave or similar apparatus, but it must be borne in mind that the temperature and pressure should not be increased to such a point that the cellulose molecule itself, or the cellulose ether ester produced by the reaction, is degraded by the higher temperature or pressure treatment. Such an increase of temperature and pressure may, in some instances, be desirable as the time for the esterification will be considerably decreased.

We have found it generally desirable to effect the esterification of alkyl ethers of cellulose at atmospheric pressure and at approximately 100° C. At this temperature and pressure the esterification of the ether progresses uniformly and without appreciable degradation of the resulting product, while the time required for the completion of the esterification at any temperature will be determined by the amount of the organic acid it is desired to have combined with the cellulose ether.

After the esterification has progressed to the desired extent, the whole esterification mass may be plunged into a suitable coagulating medium as, for example, water. By this method the ether ester of cellulose is separated from most of the esterifying ingredients. Upon being removed from the precipitating bath the ether ester may be washed thoroughly with a non-solvent for the mixed cellulose derivative and subsequently dried. Any non-solvent coagulating bath may, of course, be employed, and in some instances the use of an organic non-solvent such as benzol, toluol, etc., from which the reacting ingredients may be readily separated will effect further economy in the operation of this process.

We shall now give several examples for the preparation of these mixed ether esters of cellulose, but it will be understood that we shall not be restricted in our process to the particular ingredients or proportions therein given except as they may be indicated in the appended claims. Ten parts of cellulose ethyl ether may be dissolved in 100 parts of glacial acetic acid and after digesting at a temperature of 100° C. for a period of 41 hours and in a container fitted with a suitable reflux condenser or other means for preventing loss of the reacting ingredients, there is produced a cellulose ethyl ether containing 7.3% acetyl. This cellulose ether acetate will be found to be soluble in ethylene chloride, 1-4 dioxan and other solvents or solvent mixtures, such as benzol-alcohol, ethylene chloride-alcohol, chloroform-alcohol and even in benzol or ethanol alone.

20 parts of cellulose ethyl ether may be digested in a mixture containing 25 parts of 85% lactic acid and 75 parts of 1-4 dioxan; this reacting mixture may then be heated to a temperature of 100° C. for a period of 90 hours. The resulting material may then be precipitated in water and washed to neutrality with the same solvent. The resulting lactic acid ester of cellulose ethyl ether will be found to contain 4.7% or thereabouts of lactyl groups.

From a consideration of the above disclosure, it will be evident that cellulose ethers and particularly the alkyl ethers may be readily esterified by digesting them at a suitable temperature with organic acids which are either solvents for the ether or which may react in a solvent mixture with the ether, or that the cellulose ether and the organic acid may be brought together in varying proportions without in any way departing from the scope of this invention or sacrificing any of the advantages that may be derived therefrom.

Having now described our invention, what we claim as new and desire to be secured by Letters Patent of the United States is:

1. A process for the manufacture of ether esters of cellulose which comprises digesting the cellulose ether at a temperature of approximately 100° C. in the presence of lactic acid and a common solvent for the cellulose ether and the latic acid.

2. A lactic acid ester of cellulose ethyl ether containing approximately 4.7% lactyl.

3. A process for the manufacture of a lactic acid ester of cellulose ethyl ether which comprises digesting the cellulose ethyl ether with lactic acid and 1-4 dioxan.

Signed at Springfield, Mass., this 3rd day of December 1929.

CHARLES S. WEBBER.

Signed at Rochester, New York, this 6th day of December, 1929.

CYRIL J. STAUD.